July 11, 1961 G. V. LENNON III, ET AL 2,992,327

SQUELCH CIRCUIT FOR TRANSISTOR SUPER-REGENERATIVE RECEIVERS

Filed May 15, 1958

INVENTORS:
JOHN E. DURKEE
GEORGE V. LENNON, III
BY
T. L. Styner
ATTY.

2,992,327
Patented July 11, 1961

2,992,327

SQUELCH CIRCUIT FOR TRANSISTOR SUPER-REGENERATIVE RECEIVERS

George V. Lennon III, Rochester, and John E. Durkee, Conesus, N.Y., assignors to General Dynamics Corporation, Rochester, N.Y., a corporation of Delaware Filed May 15, 1958, Ser. No. 735,612
6 Claims. (Cl. 250—20)

Figures 1, 2:
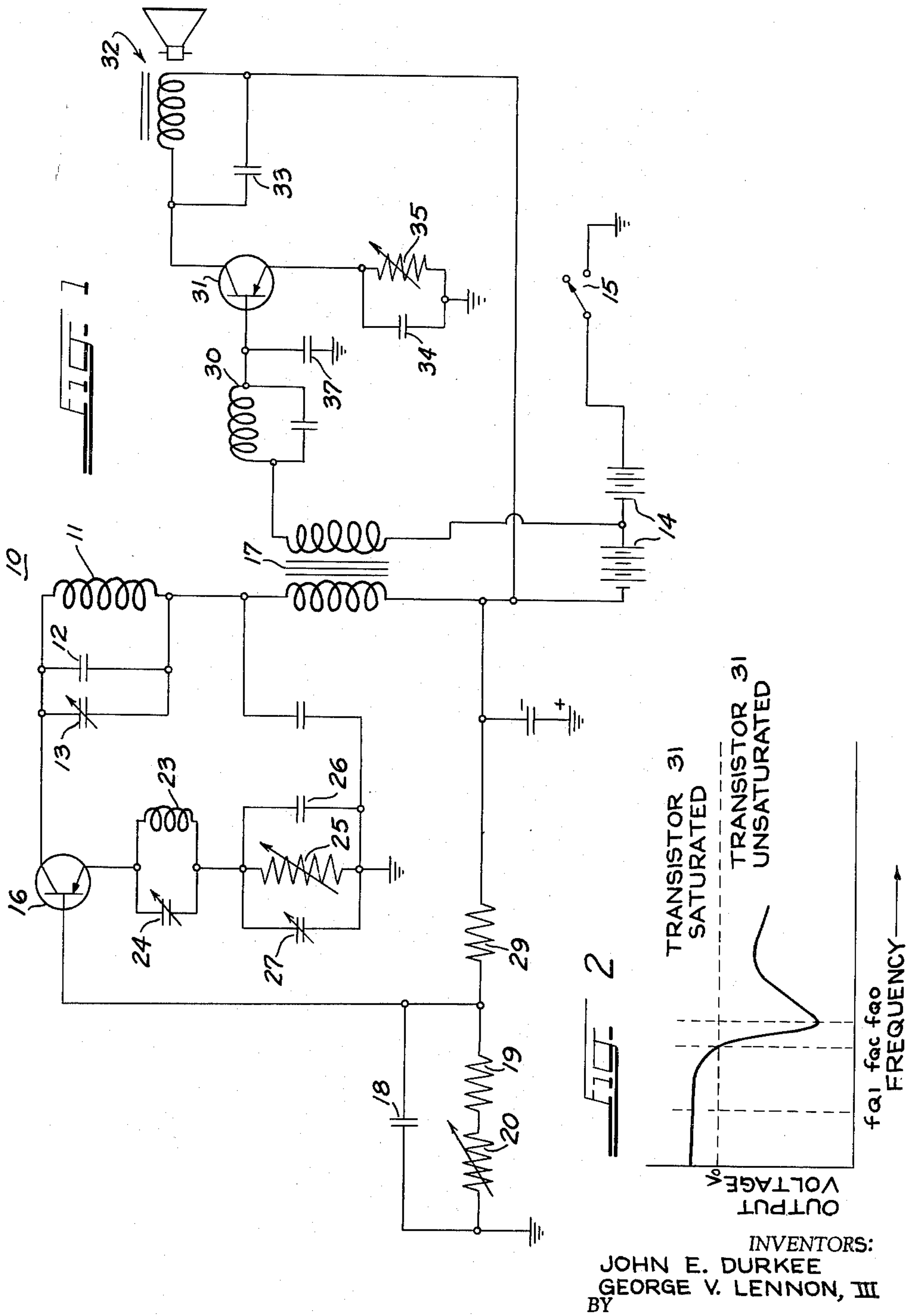

The present invention relates to radio receivers and it relates more particularly to a new and improved squelch circuit which is both efficient and reliable in operation and which utilizes relatively few components so as to enable the provision of a receiver which is small in size, simple in construction, and inexpensive to manufacture.

Radio receivers which are sufficiently small to fit in one's pocket or, perhaps, to be strapped to the wrist have many important uses such, for example, as a primary component in paging systems of the type presently used in industrial plants, hospitals, and the like. Moreover, such receivers can be carried by firemen during the fighting of a fire to provide direct communication between a number of firemen and a central station from which fire fighting directions are given to the individual firemen. In this latter application the receivers must be so small in size and light in weight as not to interfere, in any appreciable way, with the activities of the firemen, but they must also be extremely reliable in operation to insure that the communication links between the central station and the individual firemen are maintained at all times.

In order to minimize the number and size of the circuit components used in a radio receiver, it is desirable to employ a super-regenerative detector circuit which is periodically rendered oscillatory at a quench frequency substantially less than the signal frequency. Such detectors tend to be quite noisy in the absence of a received carrier wave, and since the radio receiver of the present invention is designed for use in a system in which the carrier wave is transmitted only while a message is being sent, means must be provided to squelch the audio output circuits in the absence of a received carrier.

Therefore, an object of the present invention is to provide a new and improved radio receiver.

Another object of the present invention is to provide a new and improved radio receiver of the type utilizing a super-regenerative detector.

A further object of the present invention is to provide a new and improved radio receiver in which received noise is squelched during periods when no carrier signal is received.

Another object of the present invention is to provide a new and improved squelch circuit.

Another object of the present invention is to provide a new and improved circuit for preventing the quench frequency from interfering with the efficiency of operation of the receiver.

Briefly, the above and further objects are realized in accordance with the present invention by providing a superregenerative receiver in which the quenching signal is used to squelch the output stages of the receiver during the absence of a received carrier signal.

The invention both as to its organization and method of operation, together with further objects and advantages thereof, will best be understood by reference to the following detailed description taken in connection with the accompanying drawing, in which:

FIG. 1 is a schematic circuit diagram of a radio receiver embodying the present invention; and FIG. 2 is a voltage vs. frequency characteristic of a filter used in the receiver of the present invention.

Referring now to the drawing, and particularly to FIG. 1 thereof, a radio receiver 10 comprises an antenna coil 11 which intercepts an amplitude modulated radio signal to develop therein a current varying in accordance with the radio signal. A fixed capacitor 12 and an adjustable capacitor 13 are connected in parallel across the antenna coil 11 to provide the usual tank circuit which is adjustably tunable to select the desired signal from the various radio signals which may be intercepted by the antenna coil 11. Where the radio receiver 10 is designated for operation at a single frequency, the capacitor 13 is not ordinarily adjusted during normal use of the receiver but is adjusted at the factory after the receiver 10 is initially assembled. The receiver 10 is energized by a suitable battery 14, such, for example, as a plurality of serially connected mercury cells having the positive pole thereof connected to ground through a receiver on-off switch 15. The switch 15 is a single-throw, single pole switch which is shown in the "off" or open position. The upper end of the antenna coil 11 is connected to the collector of a PNP junction transistor 16 and the lower end of the coil 11 is connected through the primary winding of an audio coupling transformer 17 to the negative pole of the battery 14. The base is connected to ground through a capacitor 18 and a stabilizing circuit comprising a fixed resistor 19 and a variable resistor 20 so that when the switch 15 is in the "on" or closed position the coil 11 is connected in the collector to base circuit of the transistor 16.

A first tuned circuit comprising an inductor 23 and a capacitor 24 and a second tuned circuit comprising a variable resistor 25, a fixed capactor 26 and an adjustable capacitor 27 are serially connected between the emitter of the transistor 16 and ground. The negative pole of the battery 14 is also connected through a resistor 29 to the base of the transistor 16 so as to provide, in combination with the resistors 19 and 20, a voltage divider for establishing a bias potential at the bases of the transistor 16 and for determining the time constant of the charging circuit for the capacitor 18. During normal operation of the receiver 10, the super-regenerative detector circuit including the transistor 16 is periodically rendered oscillatory by virtue of the capacitor 18 which is periodically charged through the resistor 29 and discharged through the base to emitter circuit of the transistor 16 whenever the oscillations in the detector build up to a predetermined level. As the capacitor 18 discharges through the emitter circuit of the transistor 16, the potential at the base of the transistor 16 increases to a sufficiently high value that oscillations cannot be supported. The oscillations terminate at this time, but once the oscillations terminate, the transistor 16 again provides a high impedance between the emitter and base thereof so that the capacitor 18 is gradually charged by current flowing from the battery 14 through the resistor 29. When the voltage across the capacitor 18 again becomes sufficiently high that the potential of the base of the transistor 16 is below the oscillatory level, the detector oscillates and the capacitor 18 discharges through the emitter to base circuit of the transistor 16 to interrupt the oscillations. The capacitor 27 and the resistor 25 are adjusted to accurately determine the quench frequency which is that frequency at which the detector circuit is periodically rendered oscillatory.

The audio components of the detected signal which appear in the collector-to-base circuit of the transistor 16 are coupled via the transformer 17 and an LC tuned filter circuit 30 to the base of a transistor 31 which is included in a single stage of audio amplification which drives the voice coil of a loud-speaker 32. The voice coil is suitably bypassed by a capacitor 33, and a capacitor 34 and an adjustable resistor 35 are connected between ground and the emitter of the transistor 31.

Preferably, the emitter tuned circuits of the transistor 16 are adjusted to provide a quench frequency near the upper limit of the audio spectrum, and since the speaker 32 is selected to have a poor response in the upper regions of the audio spectrum, the speaker is not responsive to the quench signal. Nevertheless, if the quench signal were applied to the transistor 31 it would tend to saturate it and thus appreciably reduce the gain of the audio amplifier for the desired audio signals to which the speaker 32 is responsive. Therefore, in accordance with an important aspect of the present invention, the input circuit to the transistor 31, which circuit consists of the tuned circuit 30 and a capacitor 37, is provided for filtering the relatively high quench signal from the output of the transformer 17 during reception of a carrier wave. The tuned tank circuit 30 in series with the signal circuit and the capacitor 37 in shunt thereto comprises a type of low-pass filter particularly adapted to perform the novel functions of this invention. The transistor 31 is thus operated at maximum efficiency during reception of the carrier wave and a minimum number of stages of amplification are required for driving the speaker 32 with the detected audio signal.

It has been found that the quench frequency decreases in the absence of a carrier wave, and therefore, the frequency response of the tuned input circuit of the transistor 31 is selected to pass the frequency of the quench signal in the absence of a carrier wave but to trap it out in the presence of a received carrier wave. Therefore, the transistor 31 is saturated with the quench signal in the absence of a received carrier wave which prevents the amplification of audio noise components to which the speaker 32 is responsive.

Referring now to FIG. 2, there is shown the frequency response characteristic of the tuned trap circuit comprising the LC circuit 30 and the capacitor 37. The curve is plotted with the output voltage as the ordinate and frequency as the abscissa. As shown, with a quench signal voltage having a value about $V_0$ the transistor 31 is saturated and is, therefore, effectively cut off so that audio signals which are within the frequency response range of the speaker 32 are not amplified. At values of quench signal voltage below $V_0$ the transistor 31 is unsaturated and will amplify audio signals within the frequency response range of the transistor 31. Therefore, in accordance with the present invention, the variation in quench frequency when a carrier is and is not received is used to provide an audio amplifier which operates at maximum efficiency when the carrier wave is received and which is squelched when the carrier wave is not received. Therefore, the input circuit to the transistor 31 has a frequency characteristic such that the transistor is saturated by the quench signal in the absence of a received carrier but is unsaturated in the presence of a received carrier.

As shown, the circuit 30 is tuned to a frequency of $f_{Q0}$ which is the quench frequency in the presence of a carrier. In the absence of a received carrier the quench frequency drops to a lesser value of $f_{Q1}$ which is below the cutoff frequency of $f_{QC}$ at which the transistor 31 becomes saturated. The capacitor 37 is provided to extend the bandwidth of the filter above the cutoff frequency $f_{QC}$ while maintaining the sharp selectvity thereof in the region of the cutoff frequency $f_{QC}$.

The present invention thus provides a radio receiver in which the audio amplifier is operated at maximum efficiency during reception of a reproducible signal and is squelched during periods when no signal is received so that undue noise is not produced by the speaker 32.

By way of illustration only, and not by way of limiting this application thereto, the following component values have been found to give efficient operation in a particular construction of the disclosed radio receiver.

| | |
|---|---|
| Transistor 16 | SB103. |
| Transistor 31 | 2N132. |
| Resistor 19 | 2700 ohms. |
| Resistor 20 | 1200 ohms maximum. |
| Resistor 25 | 1 kilohm maximum. |
| Resistor 29 | 33 kilohms. |
| Resistor 35 | 3 kilohms maximum. |
| Inductor 23 | 5.6 microhenries. |
| Inductor in trap 30 | 10 millihenries. |
| Capacitor 12 | 62 micromicrofarads. |
| Capacitor 13 | 5–25 micromicrofarads. |
| Capacitor 18 | .005 microfarad. |
| Capacitor 24 | 5–25 micromicrofarads. |
| Capacitor 26 | 26 microfarads. |
| Capacitor 27 | .01 microfarad. |
| Capacitor 33 | .005 microfarad. |
| Capacitor 34 | 25 microfarads. |
| Capacitor 37 | 470 micromicrofarads. |
| Capacitor in trap 30 | .01 microfarad. |
| Battery 14 | 3.9 volts (three, 1.3 volt cells). |

While there has ben described what is at present considered to be the preferred embodiment of the invention, it will be understood that various modifications may be made therein which are within the true spirit and scope of the invention as defined in the appended claims.

What is claimed as new and desired to be secured by Letters Patent of the United States is:

1. In a radio receiver, the combination of a detector circuit, means for periodically rendering said detector circuit oscillatory, said detector circuit being of the type in which the oscillatory frequency of the detector circuit in the presence of a received signal is different than the oscillatory frequency in the absence of a received signal, transducer means responsive to a detected output signal from said detector circuit, a transistor amplifier interconnected between said transducer means and said detector circuit for amplifying said output signal before application thereof to said transducer means, said amplifier being of the type which will saturate with an abnormal signal voltage, and a frequency responsive coupling circuit interposed between said amplifier and said detector circuit for coupling said output signal to said amplifier, said coupling circuit having a relatively sharp attenuation characteristic between said oscillatory frequency at which said detector circuit is rendered oscillatory in the presence of a received signal and the frequency at which said detector circuit is rendered oscillatory in the absence of a received signal whereby said transistor is saturated in the absence of a received signal and it is unsaturated in the presence of a received signal.

2. A super-regenerative receiver, comprising a super-regenerative detector for a modulated carrier including means for producing a quenching signal having a frequency displaced from that of the detected signal to be reproduced, the quenching frequency of the detector being variable and being a function of received carrier strength, said detector providing an output signal including components of said detected signal and said quenching signal, load means responsive to said detected signal, coupling means for passing all said components from said detector to said load means, and signal filter means interconnected between said detector and said load, said filter means being selectively responsive to different frequency values of said quenching signal for more greatly attenuating said quenching signal during the presence of a received carrier than in the absence of a received carrier.

3. A super-regenerative receiver as set forth in claim 2 wherein said translating means includes a transistor which is saturated by the quench frequency signal during the absence of a received carrier.

4. A super-regenerative receiver as set forth in claim 3 wherein the detected signal is applied to the base of said transistor, and said load means includes a loud-speaker connected in the collector circuit of said transistor.

5. A radio receiver comprising a super-regenerative detector having a detected signal output and a quench frequency signal output which has a first frequency value when a carrier wave is received and a second frequency value when a carrier wave is not received, a transducer, amplifier means for amplifying the detected signal output and driving said transducer, and squelching means responsive to said quench frequency signal output for squelching said amplifier means when said quench frequency signal output has said second frequency value.

6. A radio receiver comprising a super-regenerative detector supplied with a modulated carrier wave and with a quench signal having a frequency varying between a first value when the carrier wave is received and a second value when the carrier wave is absent, said detector providing an output signal including a detected signal derived from said modulated carrier wave; a load circuit; amplifying means connected between said detector and said load circuit and controlled by said output signal from said detector for applying said detector signal to said load circuit; said amplifying means being of the type which will block in response to an abnormal signal voltage to squelch amplifier output current, and filter means of the low-pass type being connected between the input circuit of said amplifier and the output of said detector for sharply attenuating quench frequencies of said first value and for passing all signal frequencies below said first frequency value for rendering said amplifying means effective when said quench signal has a frequency of said first value and for rendering said amplifying means ineffective when said quench signal has a frequency of said second value.

References Cited in the file of this patent

UNITED STATES PATENTS

| | | |
|---|---|---|
| 2,576,642 | Richman | Nov. 27, 1951 |
| 2,584,132 | Kirkman | Feb. 5, 1952 |
| 2,792,494 | Suran et al. | May 14, 1957 |
| 2,840,699 | Carpenter | June 24, 1958 |